(12) United States Patent
Arnold et al.

(10) Patent No.: US 7,413,371 B2
(45) Date of Patent: Aug. 19, 2008

(54) QUICK CONNECT ANCHOR

(75) Inventors: David R. Arnold, Macomb, MI (US); Richard A. Boelstler, Lake Orion, MI (US); Robert J. Desmarais, Lake Orion, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/761,162

(22) Filed: Jan. 20, 2004

(65) Prior Publication Data
US 2005/0158117 A1 Jul. 21, 2005

(51) Int. Cl.
*B60R 22/18* (2006.01)
*F16B 21/09* (2006.01)

(52) U.S. Cl. ............... 403/353; 403/315; 403/397; 403/329

(58) Field of Classification Search ......... 403/315–318, 403/353, 397, DIG. 11, 329; 297/483; 280/808, 280/801.1
See application file for complete search history.

(56) References Cited

U.S. PATENT DOCUMENTS

| | | | |
|---|---|---|---|
| 2,621,357 A | 12/1952 | Stuman | |
| 3,239,988 A * | 3/1966 | Meyer | 411/522 |
| 3,288,192 A * | 11/1966 | Bollinger | 403/353 |
| 3,406,433 A | 10/1968 | Frey | |
| 3,437,349 A | 4/1969 | Nick et al. | |
| 3,622,203 A * | 11/1971 | Steere, Jr. | 297/482 |
| 3,626,556 A * | 12/1971 | Struck | 297/483 |
| 4,342,166 A * | 8/1982 | Johnson et al. | 403/329 |
| 4,470,716 A * | 9/1984 | Welch | 406/DIG. 11 |
| 4,786,119 A * | 11/1988 | Smuda | 403/DIG. 11 |
| 4,866,900 A * | 9/1989 | Dunn | 403/363 |
| 4,915,413 A * | 4/1990 | Meyer | 280/808 |
| 5,026,016 A * | 6/1991 | Lisowski | 248/314 |
| 5,051,021 A * | 9/1991 | Pelz | 403/316 |
| 5,131,781 A * | 7/1992 | Klein | 403/329 |
| 5,215,332 A | 6/1993 | DeSloovere et al. | |
| 5,427,412 A * | 6/1995 | Staniszewski | 297/483 |
| 5,529,271 A * | 6/1996 | Dunchock | 248/205.2 |
| 6,254,302 B1 * | 7/2001 | Kraus | 403/316 |

\* cited by examiner

*Primary Examiner*—Daniel P. Stodola
*Assistant Examiner*—Ernesto Garcia
(74) *Attorney, Agent, or Firm*—Markell Seitzman

(57) ABSTRACT

A quick connect anchor 20 for attachment to a cooperating fastener 110, the anchor including: a plate 30 configured to be placed over the fastener and configured to be moved in a first direction from a free position to a locked position; and a resilient blocking member 50 movable with the plate from a first position, in which the resilient member is free from the fastener, to an engaged position in engagement with a portion of the fastener, to resiliently connect the plate with the fastener when the plate is in its locked position.

6 Claims, 9 Drawing Sheets

QUICK CONNECT ANCHOR

BACKGROUND AND SUMMARY OF THE INVENTION

The present invention relates generally to anchor mechanisms and more particularly to anchors used in safety restraint systems.

Reference is made to FIG. 8, which illustrates an anchor 700 comprising a steel plate 702. The plate 702 includes a fastener opening 704 and another opening 706. The plate 702 is secured to a portion of a vehicle frame, vehicle floor or seat by a shoulder bolt 710 having a head 712, a shoulder portion 714 and a threaded portion 716. The shoulder bolt 710 is received within opening 704 and secured to the vehicle part. The plate 702 is rotatable about the shoulder portion 714 of the bolt. A wire cable or length of seat belt webbing shown as phantom line 720 is secured to the plate 702 at opening 706 and attached to a safety component such as a seat belt buckle 730.

In certain situations there is not sufficient room to first place the plate near its mounting location, position the bolt laterally of the plate and then insert and fasten the bolt 710. Reference is briefly made to FIG. 9, which illustrates an automotive seat 750 (with 750a and cushion 750b), which has been installed in a vehicle proximate a side wall 752 of the vehicle. As can be seen there is not sufficient room, see space 754, in this installation to first position the anchor plate 702 adjacent a side portion of the seat 750, then position the bolt laterally of the anchor plate 702 and insert the bolt 710 through the plate 702.

In the present invention the shoulder bolt is first installed onto the seat prior to the installation of the seat in the vehicle. An anchor according to the present invention is inserted between the head end of the bolt and the vehicle side wall (or generally between the head end of the bolt and any nearby obstruction or surface) and then snapped in place on the bolt. As will be appreciated from the description below, one of the benefits of the present invention is that it permits the attachment of an anchor within the narrow operating space, however, this is not a requirement to the invention, and the anchor of the present invention can be used in many situations.

It is an object of the present invention to provide a new and useful anchor mechanism.

It is a further object of the present invention to provide a reduction of perceived noise compared to the prior art. This invention is in continuous tension, which eliminates noise.

Accordingly the invention comprises: a quick connect anchor for attachment to a cooperating fastener, the anchor comprises: a plate configured to be placed over the fastener and configured to be moved in a first direction from a free position to a locked position; and a resilient member movable with the plate from a first position, in which the resilient member is free from the fastener, to an engaged position in which the resilient member is in engagement with a portion of the fastener, to resiliently connect the plate with the fastener when the plate is in its locked position.

Many other objects and purposes of the invention will be clear from the following detailed description of the drawings.

DETAILED DESCRIPTION OF THE DRAWINGS

Figure 1A:
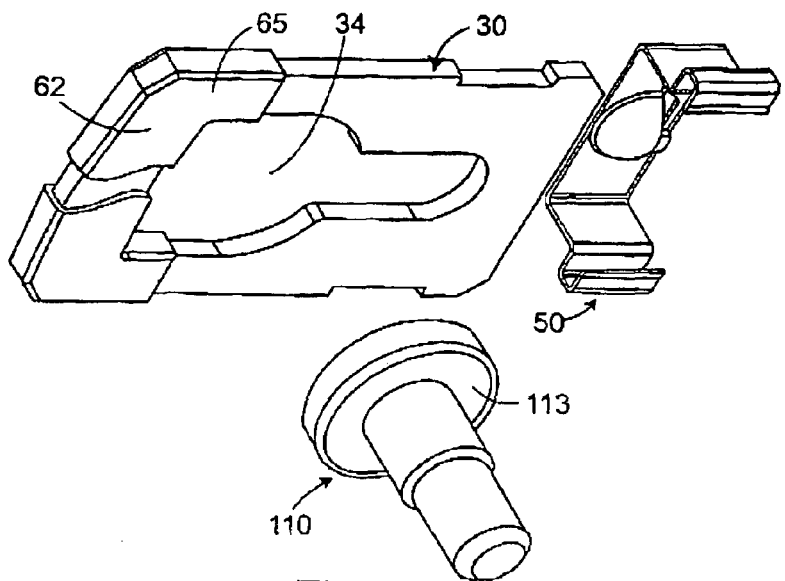
FIG. 1a shows a bottom assembly view of the major parts of the present invention in a disassembled state.

Reference is briefly made to FIGS. 1, 1a, 1b, and 1c, which illustrate the major parts of the invention and more particularly a quick connect anchor 20 comprising a plate or frame 30 and a resilient blocking member 50. The anchor 20 resiliently engages a shoulder bolt 110. The shoulder bolt 110 includes a cavity 130 on a top surface 120 thereof. The cavity 130 typically provides an open mouth or top to receive a tool such as a wrench used to tighten the bolt in place. The cavity can be hexagonally, circularly, or box shaped or have the shape to receive a Torx® bit. The plate 30 includes a tapered or keyhole opening 34 having a large diameter opening or portion 36 and a smaller diameter opening or portion 38. The large diameter opening 36 is sized to fit over the head 112 of bolt 110. The narrow diameter opening 38 is sized to closely receive the shoulder portion 114 of bolt 110.

Figure 2:
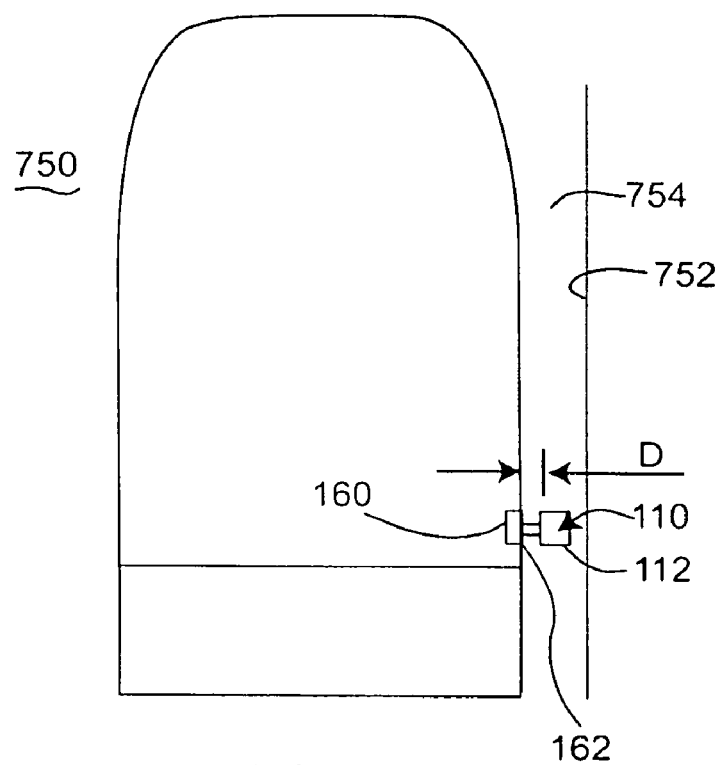
FIG. 2 diagrammatically shows a bolt extending from a vehicle seat.

Reference is briefly made to FIG. 2. In this figure the shoulder bolt 110 is shown diagrammatically mounted to a cooperating structure or surface 160 such as the seat frame. As can be seen the underside of the head of the shoulder bolt extends from seat surface 162 by a dimension D. The thickness of the plate 30 of the anchor 20 is chosen to be at least about one-half millimeter less than dimension D to enable the anchor 20 to be slid underneath the head 112 of bolt 110. The plate thickness can alternatively be significantly less than the spacing D since the head of the bolt is often spaced a relatively large distance from the surface.

Figure 1:
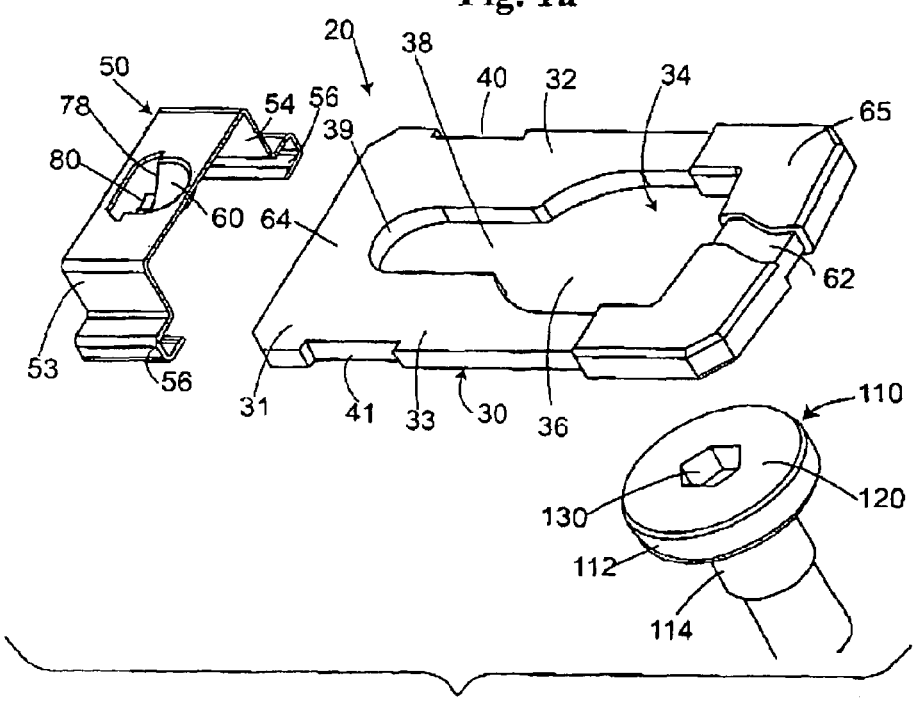
FIG. 1 shows a top isometric view of the major parts of the present invention in a disassembled state.

The resilient blocking member 50 shown in FIGS. 1, 1a-1c comprises a flexible bridge 52 that extends laterally relative to a first side 32 and a second side 33 of the plate 30. The resilient blocking member 50 further includes first and second legs 53 and 54. Each leg is secured to one of the plate sides 32 and 33 respectively. In FIG. 1 each leg 54 and 53 is received, in a snap-fit manner, within a corresponding recess 40 or 41 on each side of the plate 30. More particularly, each leg 53 and 54 includes a respective cup-shaped hook 56 that is received within a corresponding recess (groove or notch) 41. The resilient blocking member 50 can be made of a spring steel or stainless steel. The bridge 52, legs 53 and 54 and hooks 56 are, in the preferred embodiment, made as a one-piece unit.

The bridge 52 includes a stamped depression 60. In the preferred embodiment the depression is hemispherical (generally semi-circular in cross-section). When the anchor 20 has been located to its locked position about the bolt 110, the depression 60 snaps into the cavity 130, see FIG. 1c, thereby holding or locking the anchor to the bolt preventing lateral motion between the bolt 110 and the anchor 20.

Figure 1B:
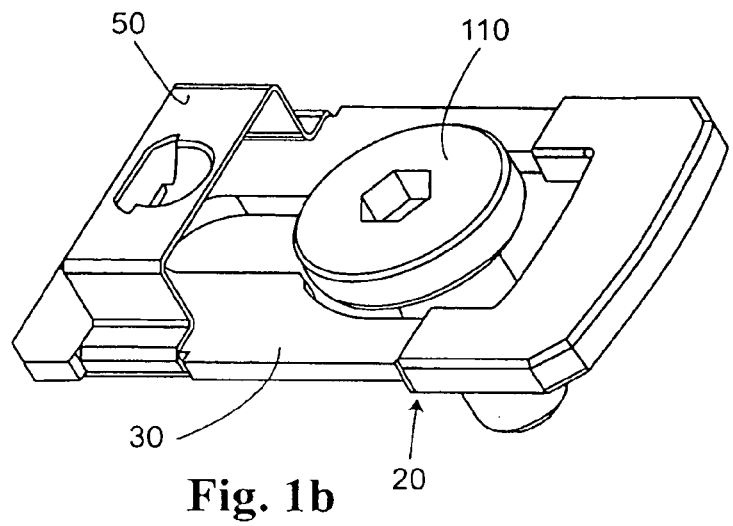
FIG. 1b shows an anchor assembly in the process of being secured to a fastener.
Figure 1C:
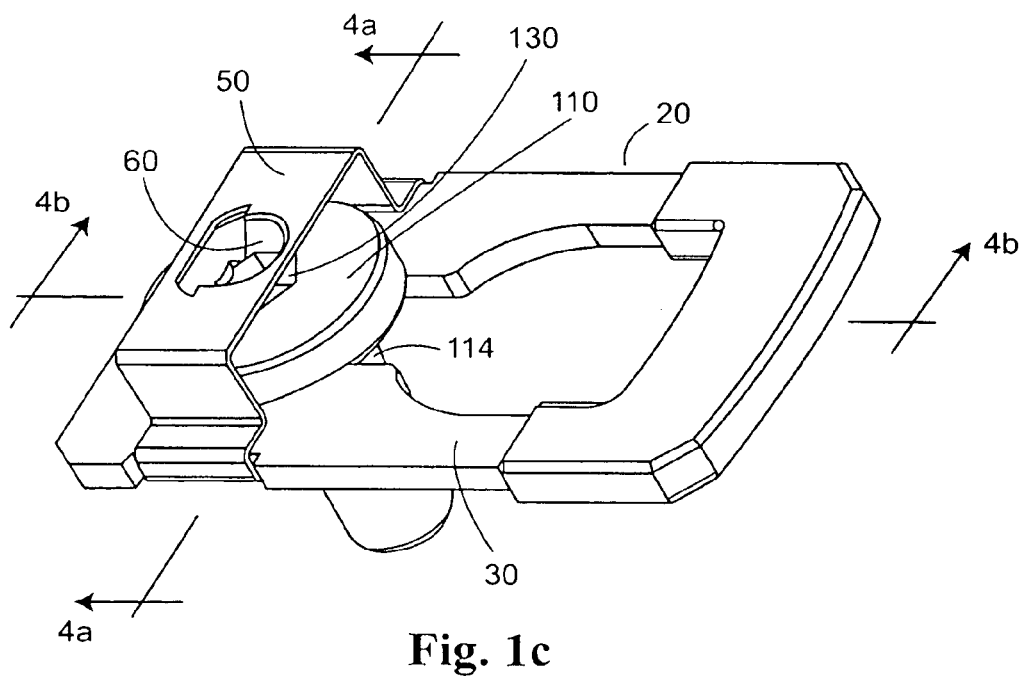
FIG. 1c shows an assembled anchor assembly.

The plate 30, see for example FIG. 1 or 2, additionally includes a first end 62, which can form the top of opening 34 and also include an opposite end 64, a portion of which forms the arcuate end 39 of opening 38. In the preferred embodiment of the invention end 62 is covered by a flexible resilient coating material 65 such as an epoxy, urethane or nylon. A seat belt buckle, not shown, is connected to end 62 of anchor 20 utilizing a loop of seat belt webbing. The buckle can be secured to the anchor 20 in other ways such as via a cable secured to another opening on the end 62. FIG. 1b shows the resilient blocking member 50 secured to the plate 30.

Figure 3:
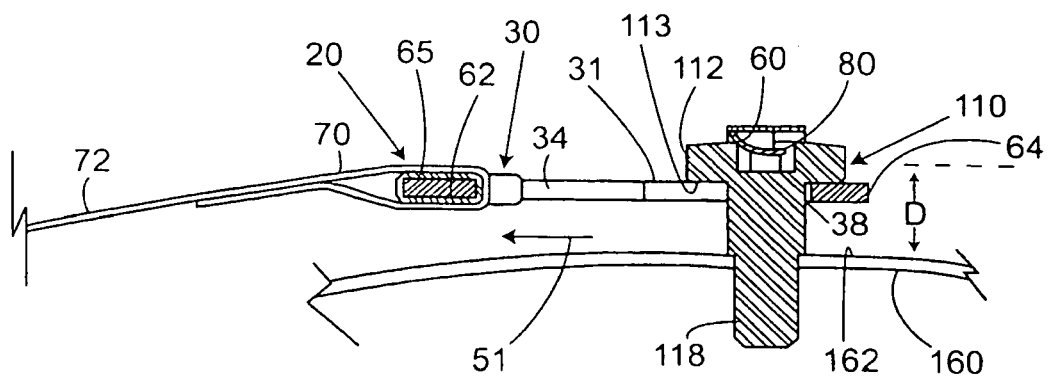
FIGS. 3 and 3a are cross-sectional views of an embodiment of the invention, showing an anchor in a locked position relative to a mounting bolt.

Reference is briefly made to FIG. 3, which is a cross-sectional view of the present invention showing the anchor 20 in engagement with the shoulder bolt 110. Additionally a loop 70 of seat belt webbing 72 is looped about end 62 as well as about the covering material 65.

The present invention is used as follows: the anchor 20, preferably with the seat belt 72 secured thereto, is first located at a free or disengaged position by manually positioning the opening 34 of the anchor over the head 112 of bolt 110. Thereafter the anchor is moved relative to the bolt, placing the plate 30 below the head 112 of the bolt with the anchor positioned about the shoulder or body 114 of the bolt. The plate 30 is moved to the right (in relation to the orientations shown in the figures), see arrow 51, to position the narrow diameter opening 38 about the shoulder 114 of the bolt 110. As the plate is moved into the position illustrated in FIG. 1c, that is, with the narrow diameter opening positioned in close proximity about the shoulder of the bolt, the bridge 52, which moves with the plate 30, becomes positioned atop the bolt 110. More particularly, as the plate 30 is moved to the right, the bridge 52 and/or the depression 60 deform as the depression contacts the head of the bolt. When the bridge 52 is positioned above the opening 130, the depression 60 enters and sits in the opening 130 to provide a snap-fit connection therebetween urging the top 31 of the plate 30 against the underside 113 of the head of the bolt 110. In this condition the anchor 20 is locked to the shoulder bolt 110 preventing lateral motion. However, the lower surface of the depression 60 can rotate relative to the cavity 130, which permits the anchor to rotate about the shoulder or shoulder portion 114.

Reference is again made to FIGS. 1, 1a, 1b and to FIG. 3. As mentioned above, stamping a semispherical shape in the bridge 52 forms the depression 60. More particularly, the depression comprises a hemispherical portion which transitions to a straight rear edge 78. The rear edge 78 is severed from the top of the bridge and is spaced below the top of the bridge 52. The rear edge 78 acts as a motion stop to prevent the rearward motion (in a direction opposite arrow 51) of the anchor 20 to prevent disengagement of the anchor from bolt 110.

Figure 4A:
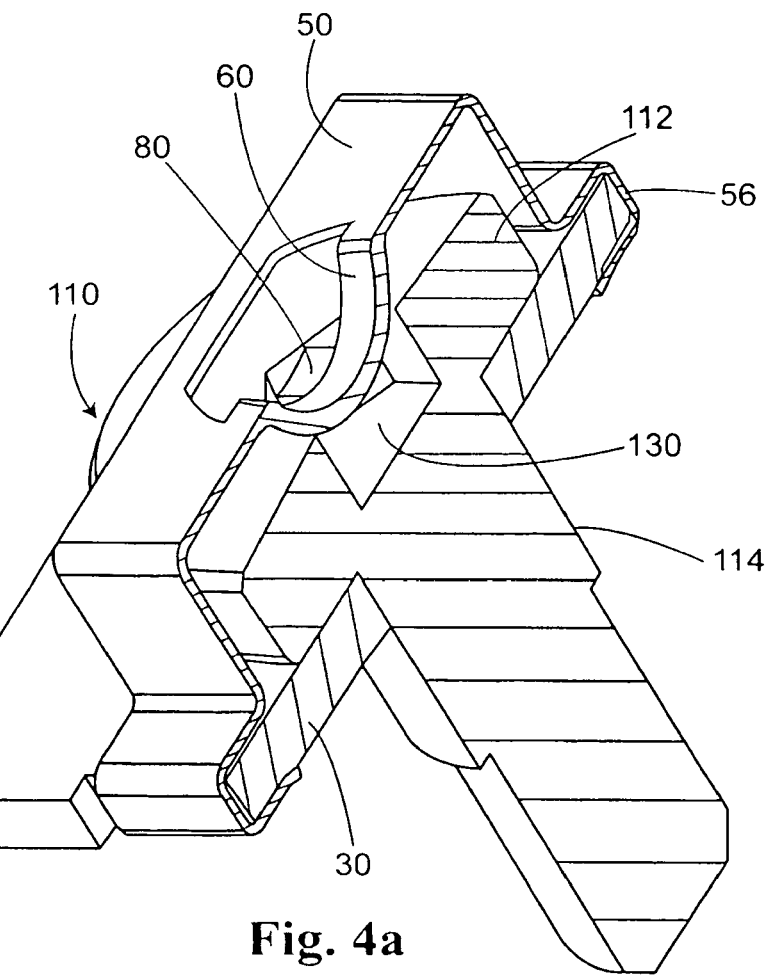
FIG. 4a is a cross-sectional view along section line 4a-4a of FIG. 1c and shows the hemispherical shape of the depression relative to the cavity 130.
Figure 3A:
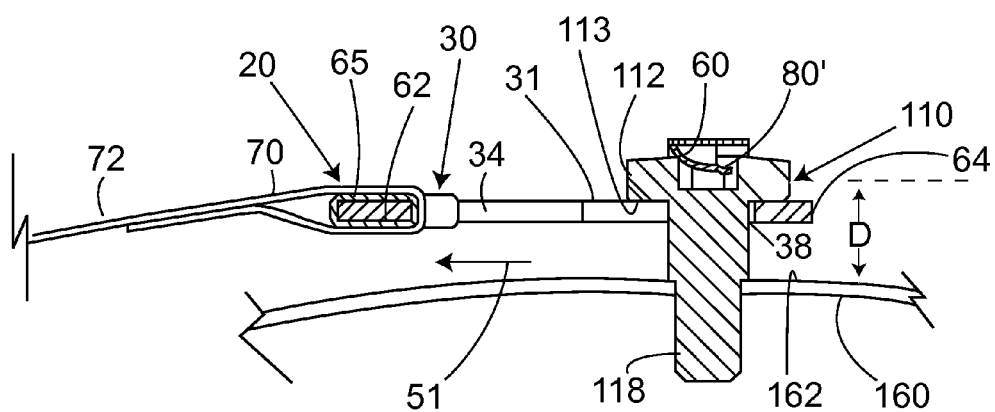
Figure 4B:
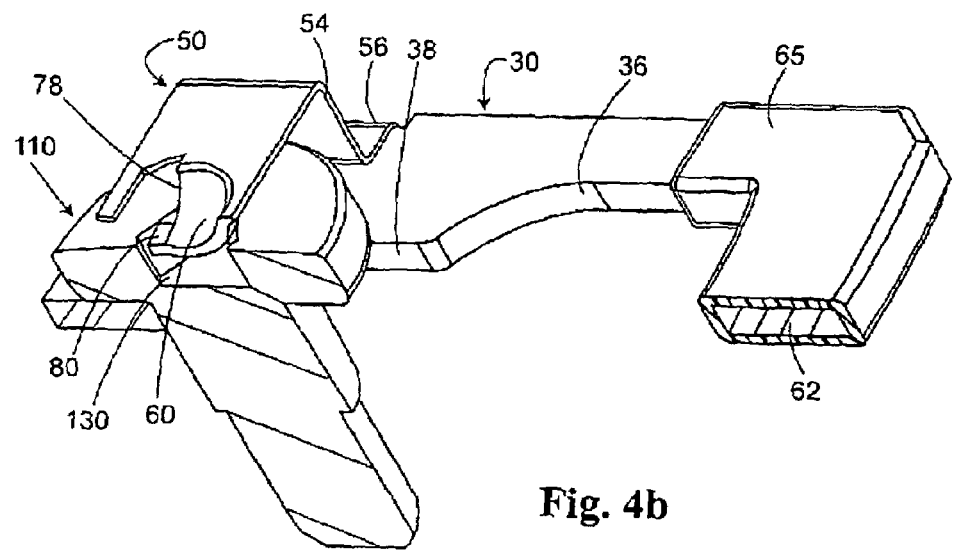
FIG. 4b is another cross-sectional view along section line 4b-4b of FIG. 1b and shows the relationship of the tab 80 and the depression.
Figure 4C:
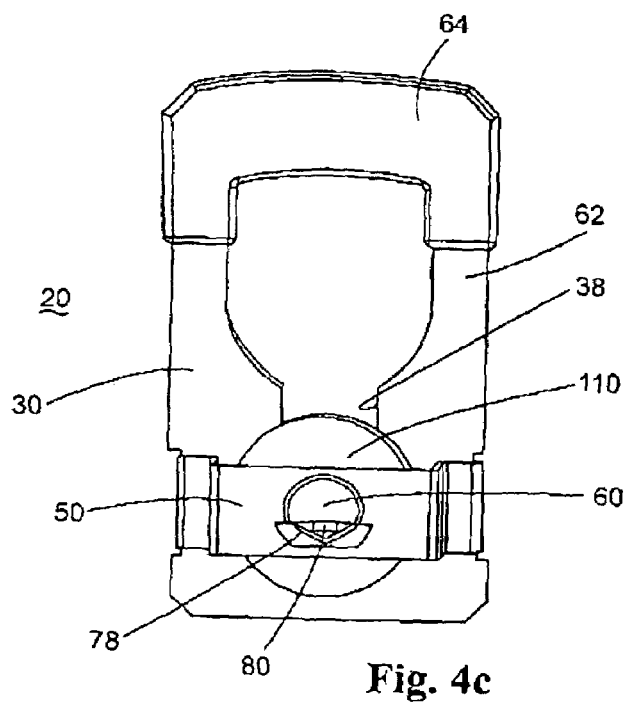
FIG. 4c is a top plan view showing the relationship of the tab 80 and the edge 78.

An optional small tab 80 can be formed as part of the depression 60. This tab 80 extends rearward of the rear edge 78. FIG. 4a is a cross-sectional view along section line 4a-4a of FIG. 1c and shows the hemispherical shape of the depression relative to the cavity 130. FIG. 4b is another cross-sectional view along section line 4b-4b of FIG. 1c and shows the relationship of the tab 80 and the depression. FIG. 4c is a top plan view of showing the relationship of the tab 80 and the edge 78. As can be seen in the figures, the tab 80 extends a further distance into the cavity 130 than does the hemispherical shape 60. For example, in FIG. 3 the tab 80 and hemispherical shape or depression 60 are in the recess and the tab extends rearward of the hemispherical shape 60. In FIG. 3a the tab 80' extends rearward and is below the hemispherical shape or depression 60. The tab 80 also acts as a motion stop preventing the disengagement of the anchor from the bolt. In view of the fact that the tab 80 extends into the cavity a significant amount, a special tool will be needed to disengage the anchor from the bolt. To permit the disengagement of the anchor from the bolt, the bridge 52 or hemispherical depression 60 will need to be deformed upwardly to permit the disengagement.

Figure 5:
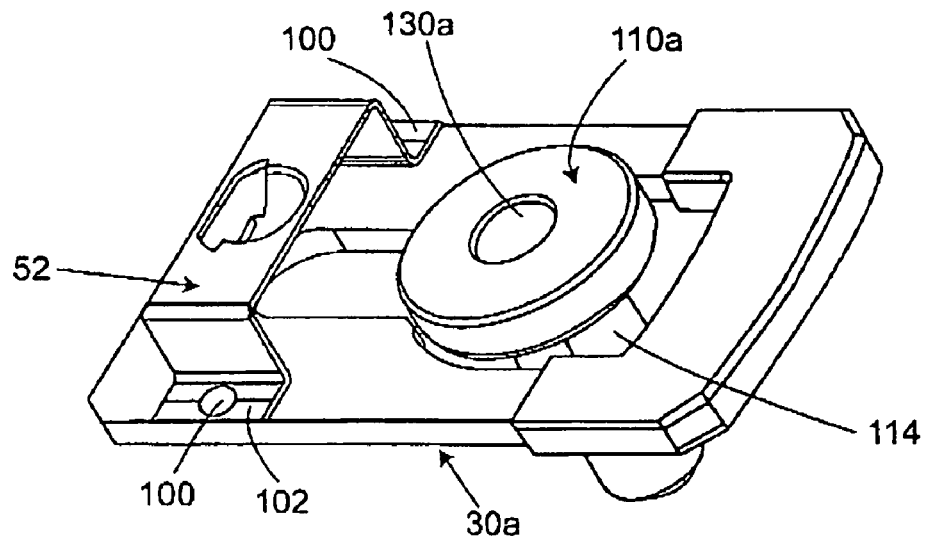
FIG. 5 shows an alternate embodiment of the invention.

Reference is briefly made to FIG. 5, which illustrates a further alternate of the invention. In this alternative the bridge 52 is secured to plate 30a utilizing a plurality of rivets 100. As can be seen the grooves 40, 41 have been removed and the bridge 52 no longer includes the hooks 56. In this embodiment the legs 53 and 54 each include an outgoing flange 102 through which a rivet 100 is received. Bolt 110a is shown relative to plate 30a. The hexagonally shaped cavity 130 has been replaced with a circular cavity 130a.

Figure 6:
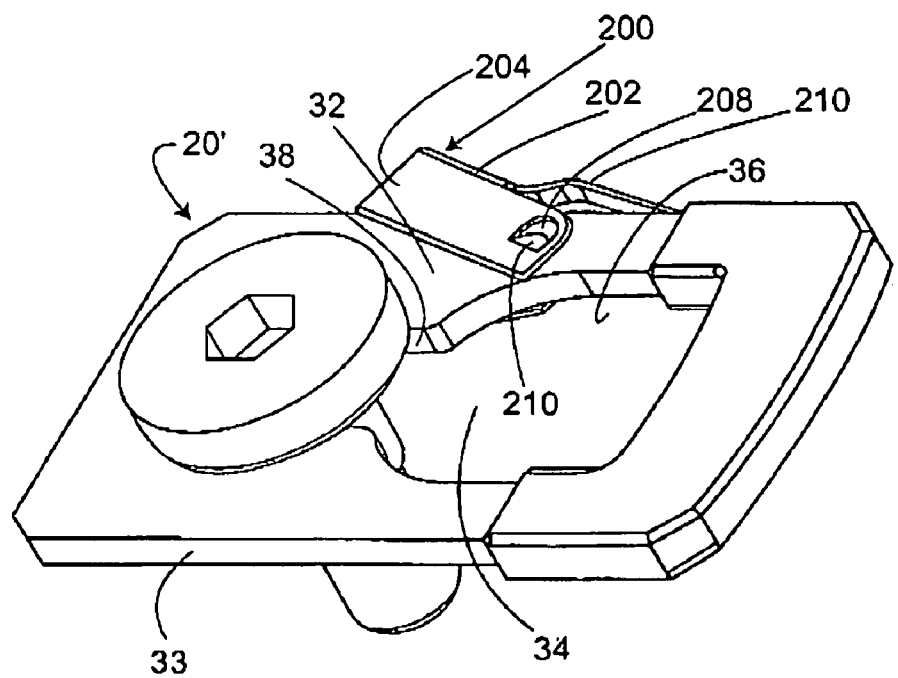
FIG. 6 shows another embodiment of the invention.

FIG. 6 shows another embodiment of an anchor 20' using the present invention, which uses a resilient blocking member 200 to hold the plate 30 to the bolt 110. The blocking member 200 is movable relative to the side of the plate 30. The plate 30 is substantially identical to the plate used in the earlier embodiments. In this embodiment the plate 30 also has the stepped or keyed opening 34 with its wide and narrow portions or openings 36 and 38. The blocking member 200 is pivotably secured to one of the side 32 or 33 of the plate 30. As illustrated the blocking member 200 is rotatably connected to side 33.

Figure 7:
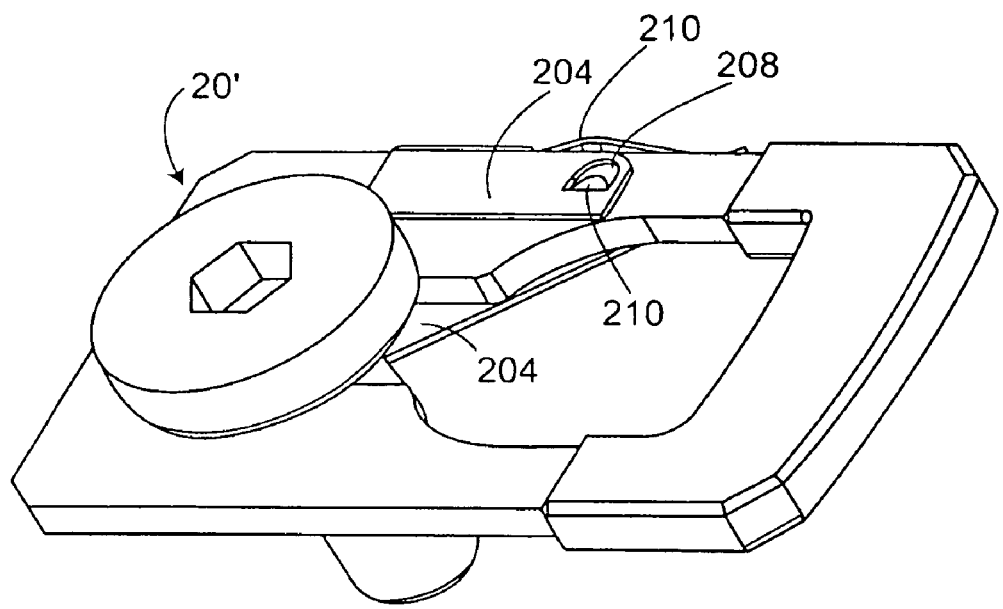
FIGS. 7 and 7a show other view of the embodiment of FIG. 6.
Figure 7A:
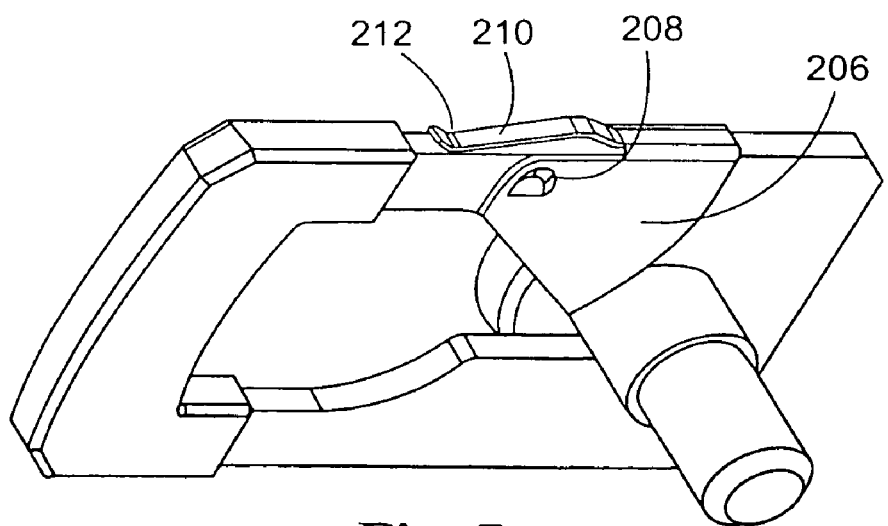
Figure 8:
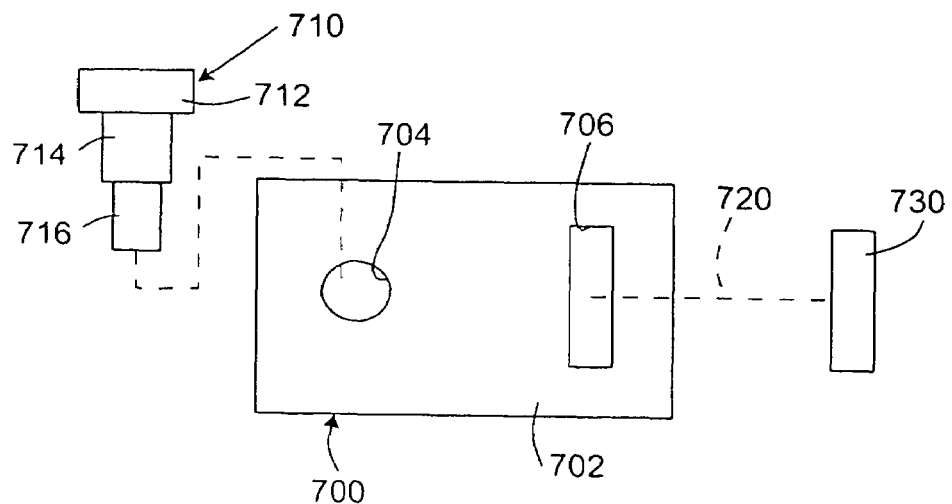
FIG. 8 diagrammatically illustrates a prior art anchoring mechanism.
Figure 9:
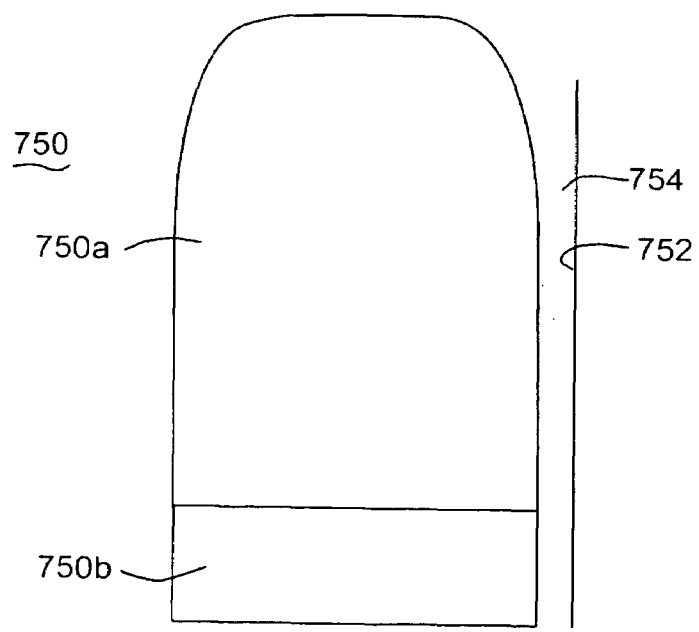
FIG. 9 diagrammatically illustrates an automotive vehicle seat closely spaced to the interior sidewall of a vehicle.

The blocking member 200 includes a U-shaped member having a bottom 202 (or center portion) with sides 204 and 206 extending therefrom. The sides 204 and 206 are dissimilar in size. Side 204 is rectangular in shape while side 206, the underside, resembles a sector of a circle and is larger than side 204. Each side 204 and 206 includes an opening 208, which rotates about a pin 210 extending through side 33. When the blocking member 200 is manually rotated away from the plate 30, the larger side 204 is been moved sufficiently away from the narrow opening 38 to permit the bolt 110 to be positioned at the end 39 of the opening 38, this condition is shown in FIG. 6. After the plate 30 is secured about the bolt 110, the blocking member 200 is subsequently rotated back to its blocking position as shown in FIGS. 7 and 7a to a position in which the larger side 206 is once again positioned within the opening 38 in blocking relation to the shoulder portion 114 of the bolt 110. In this position, the blocking member 200 prevents the disengagement of the plate 30 (anchor 20') from the bolt 110. When in the blocking position both side 204 and 206 of the blocking member 200 are positioned parallel to an opposing surface of the side 33.

The blocking member 200 includes a resilient leg 210, which extends from the bottom or center portion 202 of the blocking member 200. The resilient leg 210 includes an arcuate tip 212 which rests and slides on edge 33a of side 33 of the plate 30. The resilient leg 210 is flexible and arcuately shaped and when either in its rotated or blocking position applies a bias force 222 to the bottom or center portion 202 to urge the blocking member 200 to remain in its blocking position as shown in FIGS. 7 or 7a. When the blocking member 200 is rotated to its open position as shown in FIG. 6, the resilient leg 210 slides down the edge 33a of the side 33 as the blocking member 200 is rotated away from the side 33. The blocking member 200 is initially provided in its open or rotated position and when the plate in placed about the bolt the blocking member 200 is moved to and left in its blocking position thereby securing the anchor 20' to the bolt 110.

Many changes and modifications in the above-described embodiment of the invention can, of course, be carried out without departing from the scope thereof. Accordingly, that scope is intended to be limited only by the scope of the appended claims.

The invention claimed is:

1. A combination comprising a fastener (110) and a quick connect anchor (20), the anchor comprising:
   a plate (30), having a first and a second side and a fastener opening, the plate configured to be placed over the fastener and configured to be moved in a first direction from a free position to a locked position; and
   a resilient blocking member (50) movable with the plate from a first position, in which the resilient member is free from the fastener, to an engaged position in engagement with a portion of the fastener, to resiliently connect the plate with the fastener when the plate is in the locked position, the resilient blocking member including a first and second leg (53 and 54), the first leg is secured to the first side and the second leg is secured to the second side, the resilient blocking member further including a resilient bridge spanning a distance between the first and second leg and extending over a portion of the plate, such portion having the fastener opening;
   wherein the first and second legs are respectively received in a snap-fit manner upon the first and second side of the plate, and
   wherein each leg (52, 53) terminates in a hook (54, 55) received within a recess (56, 57) of each plate side (32, 33);
   and a motion stop to prevent the anchor (20) from moving to a position in which the anchor is free from the fastener;
   wherein the motion stop is formed from a portion of the resilient blocking member.

2. A combination comprising a fastener (110) and a quick connect anchor (20), the anchor comprising:
   a plate (30), having a first and a second side and a fastener opening, the plate configured to be placed over the fastener and configured to be moved in a first direction from a free position to a locked position; and
   a resilient blocking member (50) movable with the plate from a first position, in which the resilient member is free from the fastener, to an engaged position in engagement with a portion of the fastener, to resiliently connect the plate with the fastener when the plate is in the locked position, the resilient blocking member including a first and second leg (53 and 54), the first leg is secured to the first side and the second leg is secured to the second side, the resilient blocking member further including a resilient bridge spanning a distance between the first and second leg and extending over a portion of the plate, such portion having the fastener opening;
   wherein the first and second legs are respectively received in a snap-fit manner upon the first and second side of the plate, and
   wherein each leg (52, 53) terminates in a hook (54, 55) received within a recess (56, 57) of each plate side (32, 33);
   wherein the fastener opening in the plate includes a large diameter portion of sufficient size to permit the plate to be placed over a head (112) of the fastener, and a small diameter portion configured to receive a shoulder or a shaft (114) of the fastener, the shoulder positioned underneath the head of the fastener (110) to achieve the locked position.

3. A combination comprising a fastener (110) and a quick connect anchor (20), the anchor comprising:
   a plate (30), having a first and a second side and a fastener opening, the plate configured to be placed over the fastener and configured to be moved in a first direction from a free position to a locked position; and
   a resilient blocking member (50) movable with the plate from a first position, in which the resilient member is free from the fastener, to an engaged position in engagement with a portion of the fastener, to resiliently connect the plate with the fastener when the plate is in the locked position, the resilient blocking member including a first and second leg (53 and 54), the first leg is secured to the first side and the second leg is secured to the second side, the resilient blocking member further including a resilient bridge spanning a distance between the first and second leg and extending over a portion of the plate, such portion having the fastener opening;
   wherein the first and second legs are respectively received in a snap-fit manner upon the first and second side of the plate;
   wherein the fastener includes a head (112) having a recess in a top surface (120) thereof, and wherein the bridge includes a center portion and wherein the center portion has a depression configured to be snapped into the recess when the anchor is moved to a locked position.

4. A combination comprising a fastener (110) and a quick connect anchor (20), the anchor comprising:
   a plate (30) configured to be placed over the fastener and configured to be moved in a first direction from a free position to a locked position; and
   a resilient blocking member (50) movable with the plate from a first position, in which the resilient member is free from the fastener, to an engaged position in engagement with a portion of the fastener, to resiliently connect the plate with the fastener when the plate is in its locked position;
   the fastener including a head (112) having a recess in a top surface (120) thereof;
   the resilient blocking member (50) includes a bridge (52) wherein the bridge includes a center portion having a depressed portion configured to be snapped into the recess when the anchor is moved to a locked position; and
   a motion stop extending from the depressed portion, the motion stop extending further into the recess of the fastener than the depressed portion extends into the recess.

5. A combination comprising a fastener (110) and a quick connect anchor (20), the anchor comprising:
   a plate (30), having a first and a second side and a fastener opening, the plate configured to be placed over the fastener and configured to be moved in a first direction from a free position to a locked position; and
   a resilient blocking member (50) movable with the plate from a first position, in which the resilient member is free from the fastener, to an engaged position in engagement with a portion of the fastener, to resiliently connect the plate with the fastener when the plate is in a locked position, the resilient blocking member including a first and second leg (53 and 54), the first leg is secured to the first side and the second leg is secured to the second side, the resilient blocking member further including a resilient bridge spanning a distance between the first and second leg and extending over a portion of the plate having the fastener opening;

wherein the first and second legs are each received in a snap-fit manner upon a one of the first or second side of the plate, the fastener including a head (112) having a recess in a top surface (120) thereof, wherein the bridge includes a center portion and wherein the center portion has a depression configured to be snapped into the recess when the anchor is moved to a locked position; and wherein the depression is one-half of a circle having a rear edge (78) positioned opposite the first direction.

6. The combination as defined in claim 5 wherein a motion stop depends from the rear edge.

\* \* \* \* \*